(12) United States Patent
Lee

(10) Patent No.: US 7,535,708 B2
(45) Date of Patent: May 19, 2009

(54) FAN INTEGRATED THERMAL MANAGEMENT DEVICE

(75) Inventor: Seri Lee, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 248 days.

(21) Appl. No.: 11/532,978

(22) Filed: Sep. 19, 2006

(65) Prior Publication Data

US 2008/0068790 A1    Mar. 20, 2008

(51) Int. Cl.
*H05K 5/00* (2006.01)
(52) U.S. Cl. ............ 361/687; 165/104.44; 62/635; 257/712
(58) Field of Classification Search ........... 165/80.3, 165/121, 104.33; 62/285, 635; 257/685, 257/712, 734; 361/697, 700, 702, 679–687, 361/724–727
See application file for complete search history.

(56) References Cited

U.S. PATENT DOCUMENTS

| | | | |
|---|---|---|---|
| 5,628,551 A * | 5/1997 | Block | 312/235.7 |
| 7,019,966 B2 * | 3/2006 | Lee | 361/685 |
| 2002/0093790 A1 * | 7/2002 | Mohi et al. | 361/687 |
| 2006/0054311 A1 * | 3/2006 | Delano et al. | 165/121 |
| 2007/0230138 A1 * | 10/2007 | Otsuki et al. | 361/719 |

OTHER PUBLICATIONS

Zalman User's Manual (English Edition), CNPS7000, http://www.zalman.co.kr; http://www.zalmanusa.com; 9 pages.

* cited by examiner

*Primary Examiner*—Hung V Duong
(74) *Attorney, Agent, or Firm*—Grossman, Tucker, Perreault & Pfleger, PLLC

(57) ABSTRACT

A fan integrated thermal management device, such as a heat sink, may include an integrated fan to facilitate air flow through the device. One embodiment of the thermal management device may include a heat-conductive base and a plurality of heat-conductive extensions extending from the base and defining one or more fan blade regions. One or more fans may be mounted relative to the heat-conductive extensions such that at least one fan blade is located in the fan blade region and is configured to rotate through the fan blade region. Of course, many alternatives, variations, and modifications are possible without departing from this embodiment.

20 Claims, 5 Drawing Sheets

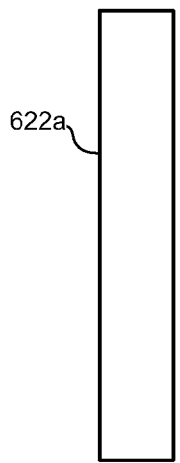 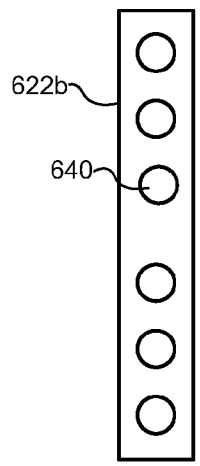 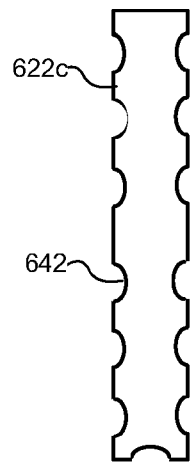 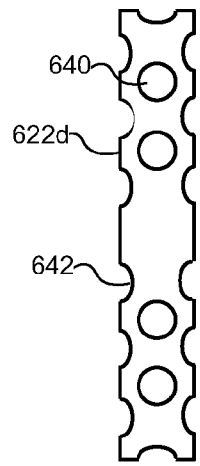
FIG. 6A  FIG. 6B  FIG. 6C  FIG. 6D
   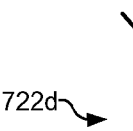 
FIG. 7A  FIG. 7B  FIG. 7C  FIG. 7D  FIG. 7E
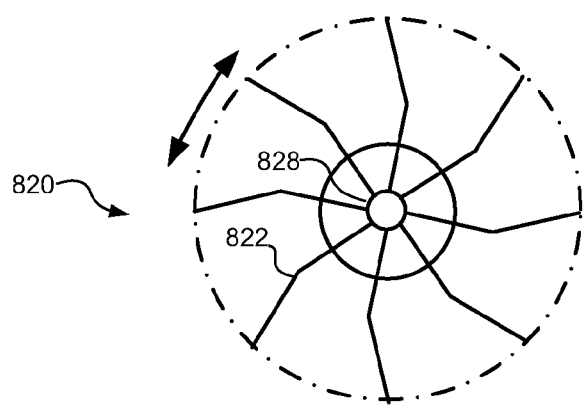
FIG. 8

FAN INTEGRATED THERMAL MANAGEMENT DEVICE

FIELD

The present disclosure relates to thermal management devices, such as heat sinks, and more particularly, relates to a fan integrated thermal management device.

BACKGROUND

Thermal management devices, such as heat sinks, have been used on circuit boards to absorb or dissipate unwanted heat generated by heat generating components, such as processors and chipsets. Developments in computer hardware have resulted in higher processing speeds and increased power requirements for circuit boards and electronic components. As power requirements for circuit board components increase, larger heat sinks have been used to cool the heat generating components. To increase heat dissipation further, fans may be used to provide forced convection within a computer or electronic system or to provide impinging cooling directly on a heat sink.

Developments in computer hardware have also resulted in space constraints, particularly in small form factors and modular computer platforms, such as Advanced Telecommunications Computing Architecture (AdvancedTCA), Advanced Mezzanine Card (AdvancedMC) and Compact Peripheral Component Interconnect (CompactPCI). Thus, the available volume for components on printed circuit boards in such environments is limited. The space constraints may include, for example, height restrictions on the sides of the printed circuit boards as well as limited real estate on and within the circuit boards.

Conventional heat sinks may include a top-mounted axial fan or blower to provide impinging cooling on the heat sink. Such fans may be mounted entirely external to the volume defined or outlined by the heat sink. In such systems, additional form factor volume may be required for the fan assembly. Also, the air flow generated by an externally mounted axial fan may be dispersed and dampened by the time the air reaches the target surface on the heat sink, limiting the cooling effectiveness as a turbulent flow. In a conventional top-mounted-fan heat sink, the effective air-flow coverage area may be confined to the circular shape and dimensions of the fan.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIGS. 6A-6D are schematic views of fan blades having different planar profiles, which may be used in a fan integrated thermal management device, consistent with embodiments of the present disclosure;

FIGS. 7A-7E are side views of fan blades having different longitudinal profiles, which may be used in a fan integrated thermal management device, consistent with embodiments of the present disclosure;

FIG. 8 is a side schematic view of a fan including bent fan blades, consistent with one embodiment of the present disclosure;

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
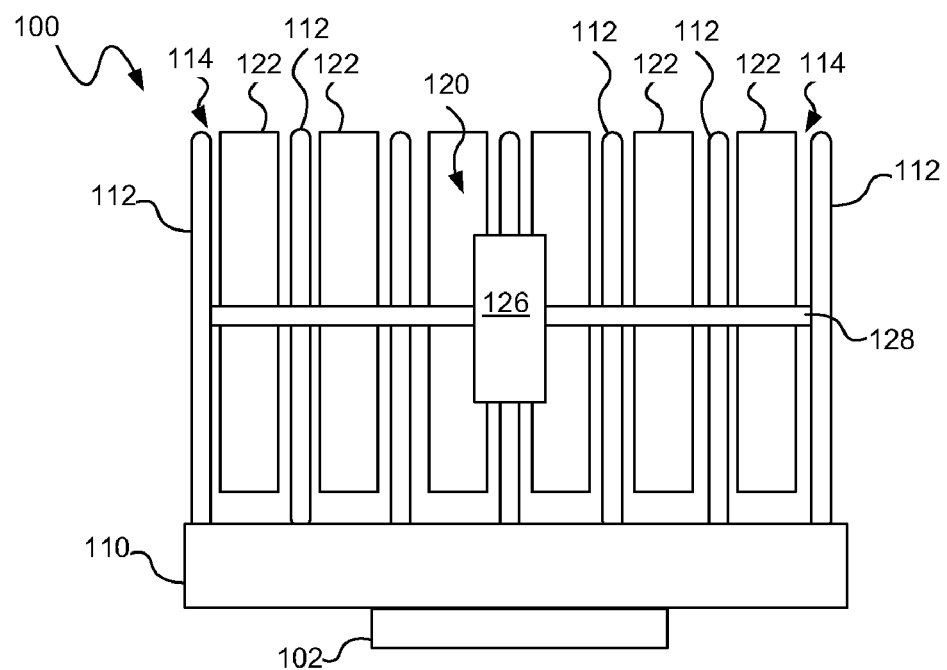
FIG. 1 is a front schematic view of a fan integrated thermal management device, consistent with one embodiment of the present disclosure.
Figure 2:
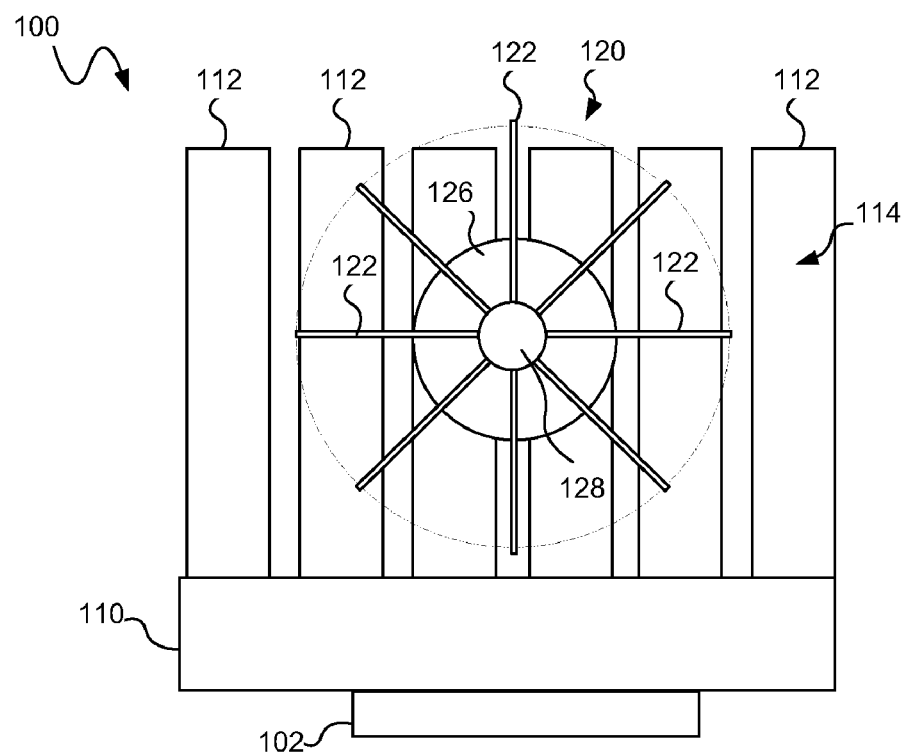
FIG. 2 is a side schematic view of the fan integrated thermal management device shown in FIG. 1.

Referring to FIGS. 1 and 2, a fan integrated thermal management device 100, such as a heat sink, may be thermally coupled to a heat generating component 102, for example, mounted on a circuit board (not shown). Although the exemplary embodiment is described in the context of a heat sink, a thermal management device may include any device for the transfer, absorption and/or dissipation of unwanted heat. Heat generating components may include any circuit board components that generate heat including, but not limited to, processors and chipsets. Fan integrated thermal management devices, consistent with the present disclosure, may also be used on heat generating components other than circuit board components.

The fan integrated thermal management device 100 may include a heat-conductive base 110 and a plurality of heat-conductive extensions 112 extending from the heat conductive base 110. The heat-conductive extensions 112 define one or more fan blade regions 114 between the heat-conductive extensions 112, which are configured to receive one or more fan blades. In one embodiment, the heat-conductive extensions 112 extend from various location across the heat-conductive base 110 to define a plurality of fan blade regions 114 between adjacent heat-conductive extensions 112. The heat-conductive extensions 112 may include heat sink fins such as planar fins, cross-cut fins and/or pin fins. The heat-conductive extensions 112 may extend as one-piece with the heat-conductive base 110 or may be attached or secured to the base 110 such that heat may be conducted from the heat generating component 102 to the extensions 112. The heat-conductive base 110 and heat-conductive extensions 112 may be made of any heat conductive material known to those skilled in the art. The design of the fan integrated thermal management device 100 may be based on heat sink designs known to those skilled in the art.

The fan integrated thermal management device 100 may further include a fan 120 including one or more fan blades 122. The fan 120 may be mounted relative to the heat-conductive extensions 112 such that the fan blade(s) 122 are located in and rotate through the fan blade region(s) 114. An axis of rotation of the fan 120 may be transverse to the heat-conductive extensions 112 and generally parallel to the heat-conductive base 110. The fan 120 may be entirely or partially embedded within the heat sink dimensional envelope. In the illustrated embodiment, the fan 120 includes fan blades 122 located in multiple fan blade regions 114 (see FIG. 1). In other embodiments, a fan integrated thermal management device 100 may include only a single fan bade region defined by the heat-conductive extensions 112.

The fan 120 may also include a driver 126, such as an electric motor, and an axle or hub 128 coupled to the driver 126 and to the fan blade(s) 122. The driver 126 rotates the hub 128 and drives the fan blades 122 through the fan blade regions 114 between the heat-conductive extensions 112. In one embodiment, the hub 128 (and thus the axis of rotation) is generally parallel to the heat-conductive base 110. In the illustrated embodiment, a plurality of fan blades 122 are attached around the hub 128 and extend generally radially, for example, similar to spokes (see FIG. 2). In other embodiments, one or more of the fan blade regions 114 may include only a single fan blade attached to the hub 128. The fan blade(s) 122 may be made of any material suitable for moving air, such as metal, plastic, or Mylar.

The driver 126 and/or the hub 128 may be supported by one or more of the heat-conductive extensions 112 or by some other structure extending from or coupled to the thermal management device 100. The driver 126 and/or the hub 128 may also be supported by a structure external to the thermal management device 100.

As will be described in greater detail below, different fan and fan blade designs may be used depending upon the design of the thermal management device (e.g., the heat sink design) and/or the desired flow characteristics.

Figures 3A, 3B, 3C:
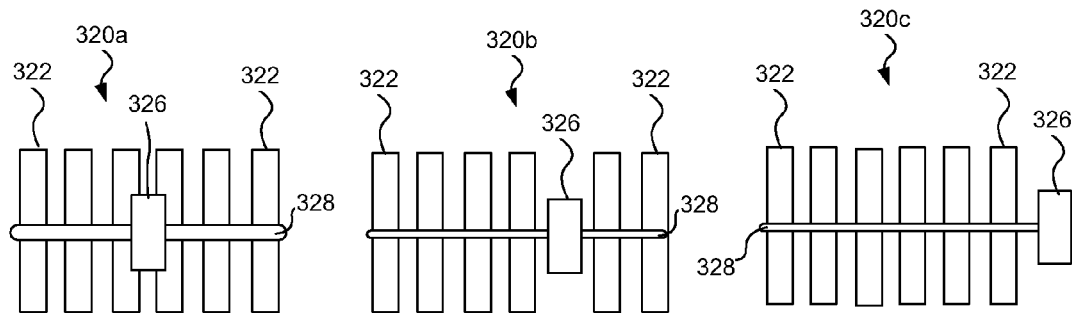
FIGS. 3A-3C are front schematic views of different fan configurations that may be used in a fan integrated thermal management device, consistent with embodiments of the present disclosure.

Referring to FIGS. 3A-3C, fans 320a-320c used in a fan integrated thermal management device may include various arrangements of the fan blades 322 and the driver 326. In the fan 320a, for example, the driver 326 may be generally located at the center of the hub 328 with a balanced number of fan blades 322 on each side of the driver 326 (e.g., three groups of fan blades 322 on each side). In the fan 320b, the driver 326 may be located on the hub 328 between unequal numbers of fan blades 322 on each side of the driver 326 (e.g., four groups of fan blades 322 on one side and two groups of fan blades 322 on the other side). In the fan 320c, all of the fan blades 322 may be located on one side of the driver 326 (e.g., with the driver 326 at the end of the hub 328). Those skilled in the art will recognize that the fan blades 322, driver 326 and hub 328 may be arranged according to various other configurations with different numbers of groups of fan blades.

Figures 4A, 4B:
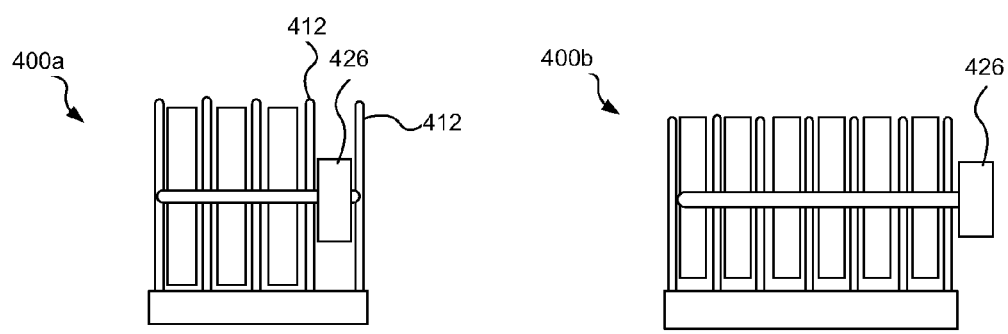
FIGS. 4A-4B are front schematic views of different fan integrated thermal management devices including drivers having different positions, consistent with embodiments of the present disclosure.

Referring to FIGS. 4A and 4B, fan integrated thermal management devices 400a, 400b may include drivers 426 having different positions relative to the thermal management devices 400a, 400b. In the fan integrated thermal management device 400a, for example, the driver 426 is mounted between two heat-conductive extensions 412. In the fan integrated thermal management device 400b, the driver 426 is mounted outside of the fan integrated thermal management device 400b. Those skilled in the art will recognize that the driver 426 may be mounted in various locations relative to the heat-conductive extensions 412 and/or base 410 of the thermal management devices 400a, 400b. The driver 426 may be mounted using techniques known to those skilled in the art.

Figure 5:
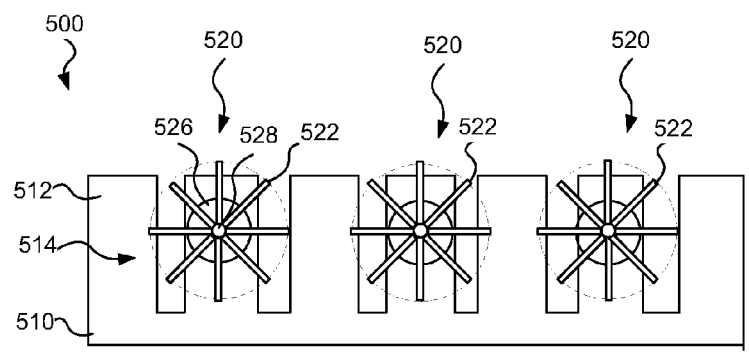
FIG. 5 is a side schematic view of one embodiment of a fan integrated thermal management device including a plurality of integrated fans, consistent with another embodiment of the present disclosure.
Figures 9A, 9B, 9C, 9D, 9E, 9F:
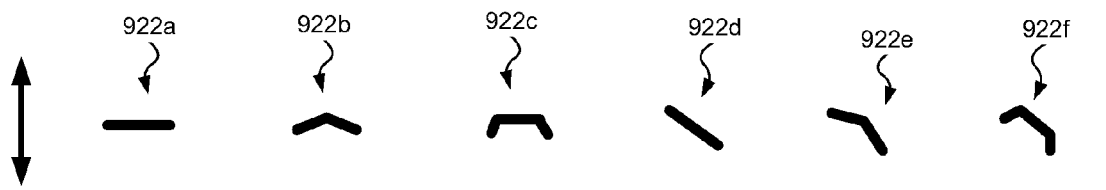
FIGS. 9A-9F are end schematic views of fan blades having different tip profiles, which may be used in a fan integrated thermal management device, consistent with embodiments of the present disclosure.

Referring to FIG. 5, another embodiment of a thermal management device 500 may include a plurality of fans 520. The fans 520 may be mounted such that the fan blades 522 are located in one or more fan blade regions 514 defined by heat-conductive extensions 512 extending from heat-conductive base 510. Each of the fans 520 may include a hub 528 coupled to groups of fan blades 522, for example, as described above. The hubs 528 may be spaced radially from each other and may be generally parallel to each other. One or more hubs 528 may also be positioned at an angle relative to other hubs 528. Each of the fans 520 may also include a driver 526 to rotate each of the hubs 528 individually. In another embodiment, a single driver (not shown), such as a motor, may be used with a rotation transfer mechanism (not shown), such as a gear or pulley mechanism, to drive a plurality of hubs 528. This embodiment of the thermal management device 500 may be useful for low profile heat sinks.

Referring to FIGS. 6A-6D, different embodiments of the fan blades 622a-622d may have different planar profiles. The fan blade 622a has a solid planar profile, the fan blade 622b has a planar profile with internal holes 640, the fan blade 622c has a planar profile with notches 642, and the fan blade 622d has a planar profile with both internal holes 640 and notches 642. In comparison to the solid profile of the fan blade 622a, the internal holes 640 and the notches 642 generally reduce the resistance force exerted by the air on the fan blades 622b-622d as the fan blades 622b-622d pass through the fan blade regions and may create additional turbulent mixing flows. The internal holes 640 may generate the added turbulent mixing along the central portion of the fan blade regions between the heat-conductive extensions, and the notches 642 may mix the flow closer to the surface of the heat-conductive extensions. Although the internal holes 640 and notches 642 are shown with a round shape, the holes and notches may also have saw-toothed, triangular, rectangular, or other shapes.

Referring to FIGS. 7A-7E, different embodiments of the fan blades 722a-722e may have different longitudinal profiles. The fan blade 722a has a straight longitudinal profile along a radial direction. The fan blade 722b has a bent profile that is bent around the middle of the fan blade 722b. The fan blade 722c has a rounded profile with rounded ends. The fan blade 722d has a bent profile that is bent toward the end of the fan blade 722d. The fan blade 722e has a straight longitudinal profile that is angled relative to a radial direction. Depending upon the direction of rotation, the different longitudinal profiles of the fan blades 722a-722e drive the air flow in different radial directions relative to the hub of a fan.

Referring to FIG. 8, one embodiment of a fan 820 may include a plurality of bent blades 822 extending from the hub 828. When the fan 820 rotates clockwise, air may be driven radially outward. When the fan 820 rotates counter-clockwise, air may be drawn radially inward. Any combination of the fan blades 722a-722e may be coupled to the hub 828 in a similar manner to generate different air flows.

Referring to FIGS. 9A-9F, different embodiments of fan blades 922a-922f may have different tip or cross-sectional profiles. The fan blade 922a has a straight tip profile. The fan blade 922b has a bent profile that is bent at the center. The fan blade 922c has a bent profile that is bent at each side. The fan blades 922d-922f have tip profiles similar to the fan blades 922a-922c but angled or skewed relative to the axis of rotation (e.g., the axis of the hub). The different tip or cross-section profiles of the fan blades 922a-922f may drive air flow in different directions with respect to the heat-conductive extensions (e.g., the fins of a heat sink).

Figure 10A:
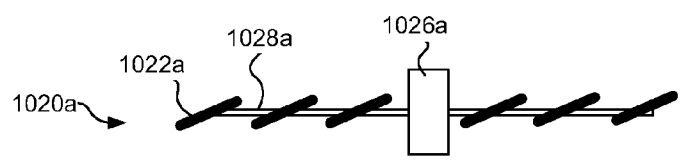
FIGS. 10A-10C are schematic end views of different arrays of fan blades, which may be used in a fan integrated thermal management device, consistent with embodiments of the present disclosure.
Figure 10B:
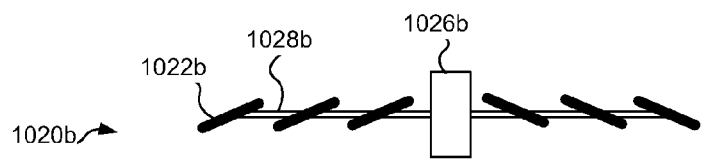
Figure 10C:
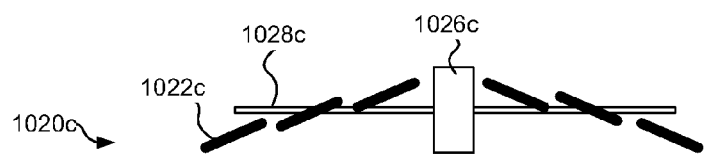

Referring to FIGS. 10A-10C, different embodiments of fans 1020a-1020c may include different arrangements of fan blades 1022a-1022c relative to the hub 1028a-1028c (i.e. the axis of rotation) and the driver 1026a-1026c. Only the tips of the fan blades 1022a-1022c are shown for clarity. The fan 1020a includes an array of fan blades 1022a assembled in line with the same angled tip orientation relative to the hub 1028a. The fan 1020b includes an array of fan blades 1022b assembled with angled tip orientations in a mirror image, for example, on each side of the driver 1026b. The fan 1020c includes fan blades 1022c assembled with the tips sequentially skewed or cascaded relative to the hub 1028c and on each side of the driver 1026c. Although the fans 1020a-1020c are shown with the drivers 1026a-1026c centrally located on the hubs 1028a-1028c, the drivers 1026a-1026c may have other locations relative to the hubs 1028a-1028c as discussed above.

The different sequences and the different orientations of the tips of the blades 1022a-1022c in different arrays may capture and re-direct air in different directions. By using an array of fan blades 1022b having a mirror image configuration (as shown in FIG. 10B), for example, the air may be driven from the top of the thermal management device toward the base and exhausted out through the sides of the thermal management device. If the angle of the fan blades 1022b is reversed or if the rotation of the fan 1020b is reversed, the air may be drawn in from the sides of the thermal management device and exhausted out through the top. By using an array of cascaded fan blades 1022c having tip profiles angled from the direction of rotation (as shown in FIG. 10C), the direction of the air flow may be controlled to move from one side to the other side of the thermal management device.

Although two-dimensional aspects of the different profiles are shown and described above, any combination of these different blade profiles and orientations of fan blades may be combined to achieve any desired air flow patterns driven by the blades. A fan blade, for example, may be designed with a combination of planar, longitudinal and tip profiles resulting in a shape similar to a propeller, a turbine blade, or a marine screw.

Different fan blade regions may also include fan blades having different profiles. For example, one fan blade region may include fan blades having a bent longitudinal profile bent in one direction (e.g., similar FIG. 8) and another fan blade region may include fan blades having a bent longitudinal profile bent in an opposite direction. Thus, the fan blades in one fan blade region may draw air radially inward while fan blades in another fan blade region may drive air radially outward. Fan blades having different profiles may also be combined in a single fan blade region.

Figure 11:
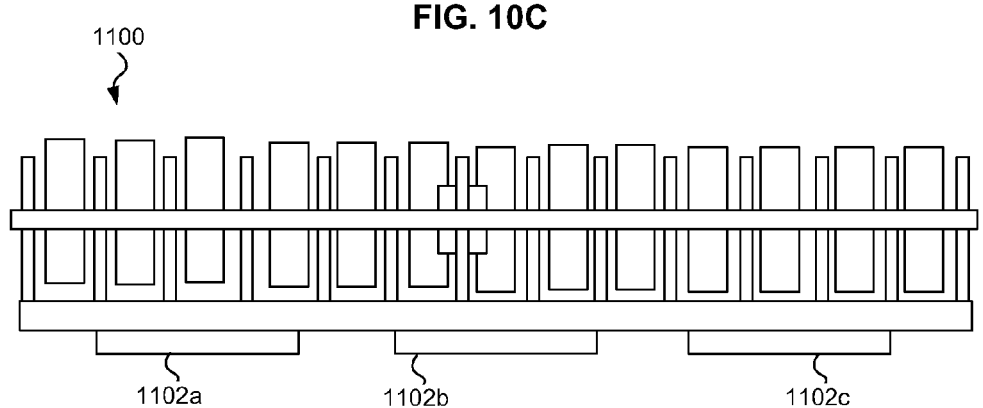
FIG. 11 is a front schematic view of a fan integrated thermal management device thermally coupled to a plurality of heat generating components, consistent with a further embodiment of the present disclosure.

As shown in FIG. 11, one embodiment of a fan integrated thermal management device 1100 may be used with an array of heat generating components 1102a-1102c, such as an array of memory modules. In this embodiment, the fan integrated thermal management device 1100 may be relatively long and narrow. For example, the fan integrated thermal management device 1100 may have a length in a range of about 4 to 6 inches and a width in a range of about 1 to 2 inches.

Figure 12:
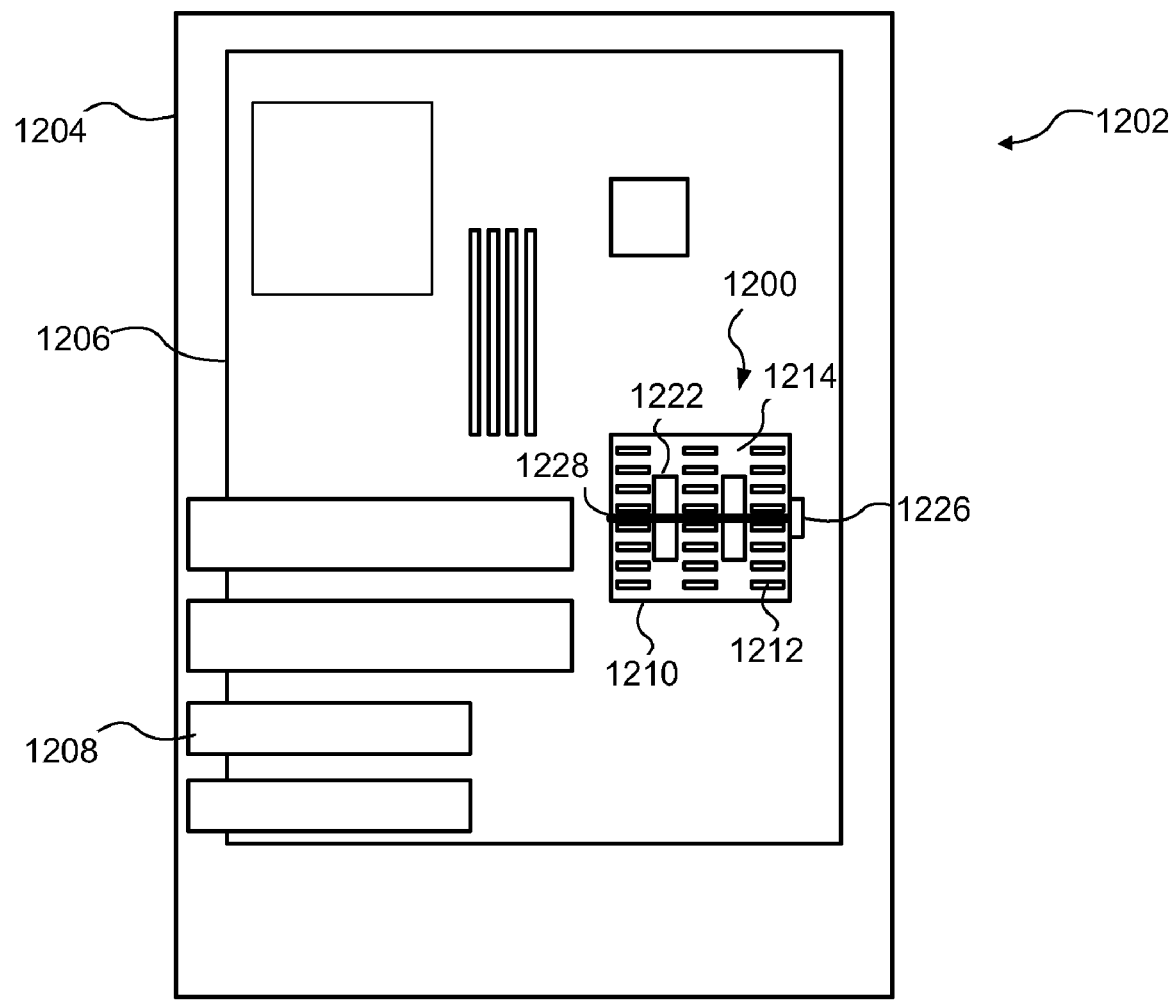
FIG. 12 is a side schematic view of a computer system including a fan integrated thermal management device, consistent with yet another embodiment of the present disclosure.

Referring to FIG. 12, embodiments of a fan integrated thermal management device 1200 may be used in a computer system 1202, such as a personal computer, to cool one or more heat generating components (not shown), such as processors. In this embodiment, the thermal management device 1200 includes a heat-conductive base 1210 and heat-conductive extensions 1212 defining fan blade regions 1214. A driver 1226 drives a hub 1228 to rotate fan blades 1222 through the fan blade regions 1214. Any one of the embodiments of the fan integrated thermal management devices described above may be used.

The computer system 1202 may include a chassis 1204 enclosing one or more circuit boards 1206, such as a mother board, and one or more devices 1208, such as a hard drive and/or an optical drive. The fan integrated thermal management device 1200 may be mounted to the circuit board 1206 and thermally coupled to the heat generating component(s) on the circuit board 1206, for example, using techniques known to those skilled in the art for mounting heat sinks.

According to alternative embodiments, fan integrated thermal management devices may be used in modular platforms, such as an advanced telecommunications computing architecture (Advanced TCA or ATCA) system. Fan integrated thermal management devices may also be used in servers, mobile products and consumer products including heat generating components.

Although the present disclosure is not to be limited by any particular theory of operation, it is believed that, as the integrated fan(s) rotates, the one or more fan blades generate outward momentum onto the airflow while creating complex vortex flows along the length of the edges of the fan blade(s). A local turbulent flow may be generated from within the thermo-mechanical boundary layers at the surfaces of the heat-conductive extensions or fins. The local turbulent flow may break the boundary layers. The combination of the outward momentum and the conservation of mass may generate air streams that mix the air flow through the channels between the heat-conductive extensions, thereby lowering the effective cooling air temperature of the thermal management device by entraining the cooler ambient air towards the hotter base of the thermal management device. The fan blades rotating near and in between the heat-conductive extensions (e.g., the fins) may thus generate complex turbulent flow within the boundary layer, breaking and mixing the air flow patterns. This turbulent flow may advantageously improve the convection performance of the heat-conductive extensions and may lower the local ambient air temperature of the surface of the thermal management device by longitudinal mixing in a direction parallel to the direction of the heat-conductive extensions.

Thus, one embodiment of an apparatus, consistent with the present disclosure, may include a heat-conductive base and a plurality of heat-conductive extensions extending from the heat-conductive base. The heat-conductive extensions define at least one fan blade region between the heat-conductive extensions. The apparatus further includes at least one fan including at least one fan blade. The fan may be mounted relative to the heat-conductive members such that the at least one fan blade is located in the fan blade region and is configured to rotate through the fan blade region with an axis of rotation transverse to the heat-conductive extensions.

Consistent with yet another embodiment, a system may include a chassis, a mother board located in the chassis, at least one heat generating electronic component mounted on the mother board, and a thermal management device thermally coupled to the heat generating electronic component. The thermal management device may include a heat-conductive base and a plurality of heat-conductive extensions extending from the heat-conductive base. The heat-conductive extensions define at least one fan blade region between the heat-conductive extensions. The thermal management device further includes at least one fan including at least one fan blade. The fan may be mounted relative to the heat-conductive members such that the at least one fan blade is located in the fan blade region and is configured to rotate through the fan blade region with an axis of rotation transverse to the heat-conductive extensions.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus comprising:
   a heat-conductive base;
   a plurality of heat-conductive extensions extending from the heat-conductive base, the heat-conductive extensions defining at least one fan blade region between the heat-conductive extensions; and
   at least one fan including at least one fan blade, the fan being mounted relative to the heat-conductive members such that the at least one fan blade is located in the fan blade region and is configured to rotate through the fan blade region with an axis of rotation transverse to the heat-conductive extensions.

2. The apparatus of claim 1 wherein the heat-conductive base and the heat-conductive extensions form a heat sink.

3. The apparatus of claim 2 wherein the fan is entirely within the envelope of the heat sink.

4. The apparatus of claim 1 wherein the heat-conductive extensions include fins.

5. The apparatus of claim 1 wherein the fan includes a driver and at least one hub coupled to the driver, and wherein the at least one fan blade is coupled to the hub.

6. The apparatus of claim 5 wherein a plurality of fan blades are coupled to the hub and located in the fan blade region.

7. The apparatus of claim 5 wherein the driver is mounted to at least one of the heat-conductive extensions.

8. The apparatus of claim 1 wherein the heat-conductive extensions define a plurality of fan blade regions, and wherein the fan includes at least one fan blade located in one of the fan blade regions and at least one fan blade located in an other of the fan blade regions.

9. The apparatus of claim 8 wherein the fan includes a driver and a hub coupled to the driver, and wherein a first plurality of fan blades are coupled to the hub and located in the one of the fan blade regions and a second plurality of fan blades are coupled to the hub and located in the other of the fan blade regions.

10. The apparatus of claim 1 wherein the at least one fan includes a plurality of fans mounted relative to the heat sink.

11. The apparatus of claim 10 wherein each of the fans includes a hub and a plurality of blades coupled to the hub, and wherein the fans are mounted such that the hubs are spaced from one another.

12. The apparatus of claim 11 further comprising at least one driver coupled to the hub of at least one of the fans and configured to drive the fans.

13. The apparatus of claim 1 wherein the fan includes at least one driver, at least one hub extending from each side of the driver, and at least first and second pluralities of fan blades coupled to the hub on each side of the driver.

14. The apparatus of claim 13 wherein the at least one hub includes a single hub extending through the driver.

15. The apparatus of claim 13 wherein the at least one hub includes first and second hubs extending from respective sides of the driver.

16. An apparatus comprising:
   a circuit board;
   at least one heat generating component on the circuit board; and
   a fan integrated thermal management device thermally coupled to the heat generating electronic component, the fan integrated thermal management device comprising:
   a heat-conductive base;
   a plurality of heat-conductive extensions extending from the heat-conductive base, the heat-conductive extensions defining at least one fan blade region between the heat-conductive extensions; and
   at least one fan including at least one fan blade, the fan being mounted relative to the heat-conductive members such that the at least one fan blade is located in the fan blade region and is configured to rotate through the fan blade region with an axis of rotation transverse to the heat-conductive extensions.

17. The apparatus of claim 16 wherein the heat-conductive base and the heat-conductive extensions form a heat sink, and wherein the fan is entirely within the envelope of the heat sink.

18. A computer comprising:
   a chassis;
   a mother board located in the chassis;
   at least one heat generating electronic component mounted on the mother board; and
   a fan integrated thermal management device thermally coupled to the heat generating electronic component, the fan integrated thermal management device comprising:
   a heat-conductive base;
   a plurality of heat-conductive extensions extending from the heat-conductive base, the heat-conductive extensions defining at least one fan blade region between the heat-conductive extensions; and
   at least one fan including at least one fan blade, the fan being mounted relative to the heat-conductive members such that the at least one fan blade is located in the fan blade region and is configured to rotate through the fan blade region with an axis of rotation transverse to the heat-conductive extensions.

19. The computer of claim 18 wherein the heat generating component includes a processor on the mother board.

20. The computer of claim 18 wherein the heat-conductive base and the heat-conductive extensions form a heat sink, and wherein the fan is entirely within the envelope of the heat sink.

* * * * *